(12) United States Patent
Reuss et al.

(10) Patent No.: US 7,738,434 B1
(45) Date of Patent: *Jun. 15, 2010

(54) CONTROL AND MANAGEMENT OF A WIRED OR WIRELESS HEADSET

(75) Inventors: Edward L. Reuss, Santa Cruz, CA (US); Rick R. Giles, San Jose, CA (US)

(73) Assignee: Plantronics, Inc., Santa Cruz, CA (US)

( * ) Notice: Subject to any disclaimer, the term of this patent is extended or adjusted under 35 U.S.C. 154(b) by 853 days.

This patent is subject to a terminal disclaimer.

(21) Appl. No.: 11/451,815

(22) Filed: Jun. 12, 2006

Related U.S. Application Data

(63) Continuation-in-part of application No. 10/091,905, filed on Mar. 4, 2002, now Pat. No. 7,376,123.

(51) Int. Cl.
*H04W 4/00* (2009.01)
(52) U.S. Cl. ............... 370/338; 455/569.1; 455/550.1
(58) Field of Classification Search ............... None
See application file for complete search history.

(56) References Cited

U.S. PATENT DOCUMENTS

| | | | |
|---|---|---|---|
| 7,292,880 B2 * | 11/2007 | Lehtonen | 455/569.1 |
| 7,343,177 B2 * | 3/2008 | Seshadri et al. | 455/563 |
| 2003/0063043 A1 * | 4/2003 | Girard | 345/8 |
| 2007/0049198 A1 * | 3/2007 | Walsh et al. | 455/41.2 |
| 2007/0165875 A1 * | 7/2007 | Rezvani et al. | 381/74 |
| 2007/0283033 A1 * | 12/2007 | Bloebaum et al. | 709/231 |

* cited by examiner

*Primary Examiner*—Michael J Moore, Jr.
(74) *Attorney, Agent, or Firm*—Haynes and Boone, LLP; David S. Park

(57) ABSTRACT

A wireless headset and a system and method for controlling or managing a wireless headset are provided. In one embodiment, a wireless headset includes a World Wide Web (Web) server for providing a Web page to control or manage a headset, and a module operably coupled to the Web server for performing a control function or a management function on the headset. A communication device including a keypad, a display, and a Web browser can then exchange information between the Web page and the Web server to control or manage the wireless headset.

18 Claims, 8 Drawing Sheets

CONTROL AND MANAGEMENT OF A WIRED OR WIRELESS HEADSET

CROSS-REFERENCE TO RELATED APPLICATIONS

This application is a continuation-in-part of U.S. patent application Ser. No. 10/091,905 filed Mar. 4, 2002 now U.S. Pat. No. 7,376,123, the full disclosure of which is hereby incorporated by reference for all purposes.

TECHNICAL FIELD

The present invention relates generally to wireless Voice over Internet Protocol (VoIP) telephony and, more particularly, to a system, apparatus, and method for controlling a wireless VoIP headset.

BACKGROUND

Wireless VoIP headsets, using for example IEEE 802.11 protocols, are currently under development by various companies. A way to enter a telephone number or management information, such as IP addresses, sub-net masks, Universal Resource Locators (URLs), etc., is a typical problem with such headsets.

Previous solutions have included configuring the wireless headset to always call a voice input proxy, using a voice recognition engine, either embedded into the headset or available somewhere on the network, thus allowing the user to speak commands and provide information (e.g., telephone numbers) to the proxy for voice input call management. However, voice interaction has usually been a slow user interface and becomes unreliable in high ambient noise environments. Another previous solution has been to use a cable, such as a universal serial bus (USB) or RS-232 cable, from the headset to a small keypad and display or even a personal computer. However, this requires extra hardware, set up, and the headset is otherwise no longer "wireless". Another previous solution has been to install a small display and keypad directly onto the wireless headset. However, any display that is large enough to be legible and keypad that is large enough to be typable are too large to wear on a user's ear.

Thus, an improved solution for managing a wireless VoIP headset is highly desirable.

SUMMARY

The present invention provides an apparatus, system, and method for controlling and managing a wireless headset.

In accordance with an embodiment of the present invention, a wireless headset is provided, the headset including a network interface for wirelessly coupling to a network; a World Wide Web (Web) server for providing a Web page to control or manage a headset; and a module operably coupled to the Web server for performing a control function or a management function on the headset.

In accordance with another embodiment of the present invention, a system for controlling or managing a wireless headset is provided, the system comprising a wireless headset including a World Wide Web (Web) server operably coupled to a network and a module operably coupled to the Web server for performing a control function or a management function on the headset. The system further includes a Web page provided by the Web server and available on the network, and a communication device including a keypad, a display, and a Web browser for sending information from the Web page to the Web server to control or manage the wireless headset.

In accordance with yet another embodiment of the present invention, a method of controlling or managing a wireless headset is provided, the method including providing a wireless headset including a World Wide Web (Web) server and a module operably coupled to the Web server for performing a control function or a management function on the headset, and serving a Web page via the Web server. The method further includes providing a communication device including a keypad, a display, and a Web browser, and uploading information to the Web server via the communication device to control or manage the headset.

Advantageously, the present invention provides a graphical user interface (GUI) for managing and/or controlling a wireless headset of any size and does not require adding extra buttons, switches, or other user interface means, thereby reducing the size and the cost of the headset.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
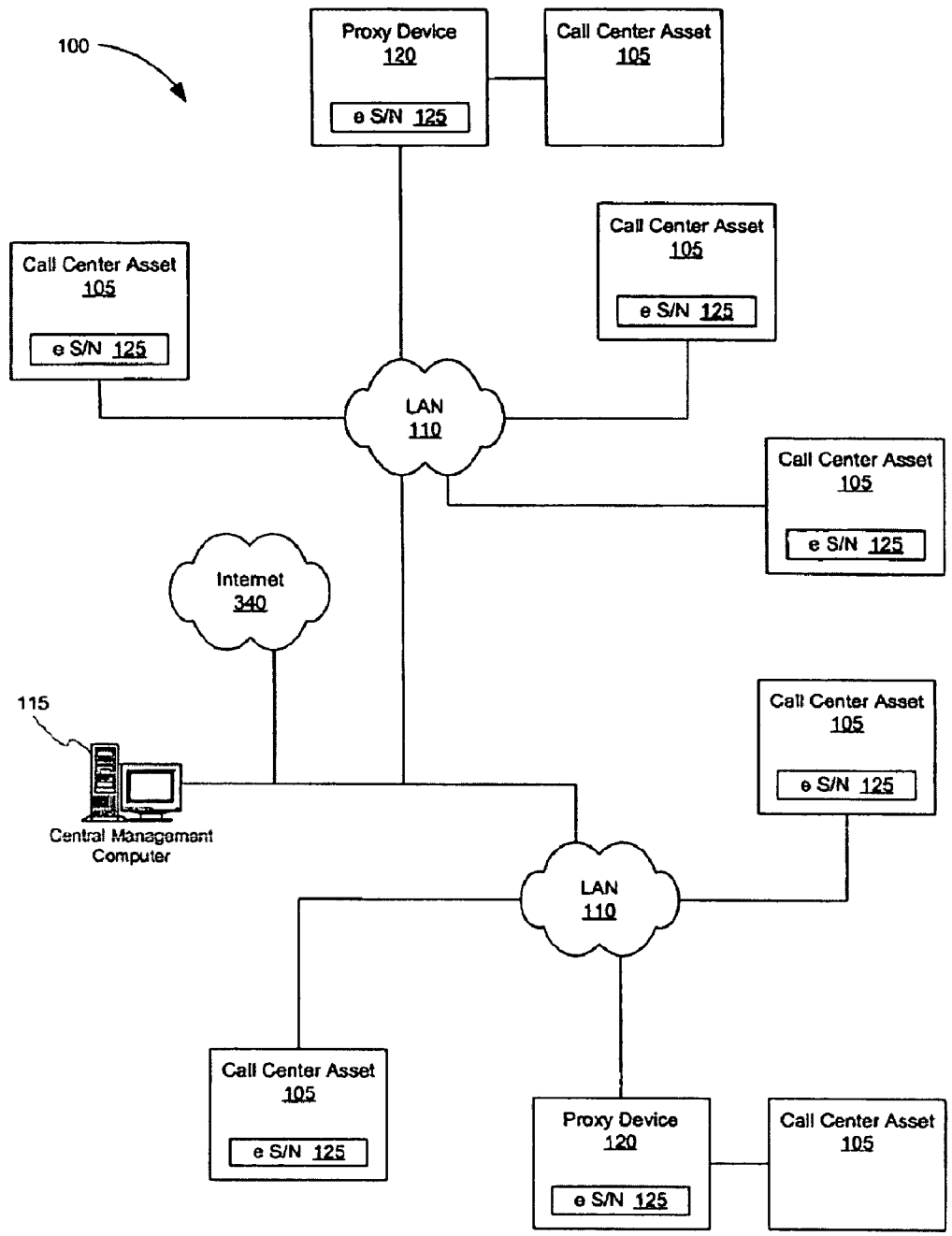
FIG. 1 is a diagram of an embodiment of the call center asset management and control system.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

Table of Contents

A. System Architecture
  1. The Call Center Asset
  2. Addressing a Call Center Asset on the Network
  3. Full Ethernet Connectivity Call Station Embodiment
  4. Cost Effective Call Station Embodiment
  5. Audio Signaling Call Station Embodiment
  6. VoIP Signaling Call Station Embodiment
  7. Other embodiments B. Applications to Asset Management and Control
  1. Asset Management: Asset Utilization
  2. Asset Management: Asset Location 3. Asset Management: Diagnostics
4. Asset Management: Software or Firmware Updates
5. Asset Control C. Protocol Layers on the Internet D. Application to a Wireless Headset A. System Architecture FIG. 1 is a diagram of an embodiment of the call center asset management and control system 100. In the system 100, one or more call center assets 105 are coupled to a network 110, which is further coupled to a management and control computer 115. In an embodiment, the computer 115 comprises a standard computer system. Some "intelligence," in the form of appropriate hardware, software, firmware, or a combination thereof, is incorporated into the call center assets 105 for performing management or control functions. Alternatively, a proxy 120 may be coupled to one or more call center assets 105 and the network 110. In one embodiment, the proxy 120 provides some or all of the management and/or control functionality for the call center asset 105 associated therewith. In another embodiment, the proxy 120 is used to communicate over the network for one or more assets 105 associated therewith.

1. The Call Center Asset

A call center asset includes telecommunications devices and systems used in a call center, such as a telephone, headset, headset adapter, on-line indicator (OLI), handset lifter, or other device for implementing the communication features of a call center. In one embodiment, the asset 105, or the combination of the asset 105 and a proxy 120, include "intelligence," in the form of a processor, program memory, buffer memory, and/or software to perform network, management, and/or control operations. In addition, a physical layer interface is provided for the call center asset 105 to enable connectivity with the management and control computer 115 over the network 110.

To facilitate communication over the network 110, the call center asset 105 is associated with a network address. Messages can be broadcast to a particular address, and hence to the call center asset 105 associated therewith, from another device on the network 110, such as the management and control computer 115. In a preferred embodiment, a call center asset 105 has an electronic serial number 125 that is globally unique, or mappable to a globally unique address. In other preferred embodiments, a call center asset 105 is coupled to a proxy 120, which assigns a network address to the call center asset 105.

Depending on the application, it may be desirable for each call center asset 105 to have a globally unique address (meaning that the asset 105 does not have the same address as another device on the network 110). In other circumstances, it may be desirable for several call center assets 105 to have the same network address. In the latter case, for example, it would be possible to broadcast data to multiple call center assets 105 simultaneously. This technique could advantageously be used to transmit software or firmware updates to a group of call center assets 105. In another embodiment, a single call center asset 105 may have associated therewith multiple network addresses, some or all of which could also be shared among several assets 105. In this way, each call center asset 105 could be a "member" of several groups of call center assets 105, the members of the group having the same network address. Each asset 105 could thus be adapted to receive data broadcasted to each group in which the asset 105 is a member.

The network addresses may be determined from the call center assets 105 or from an associated proxy 120. In one embodiment, a call center asset 105 includes an electronic serial number 125, from which one or more network addresses can be determined. In another embodiment, a proxy 120 associated with the asset 105 includes an electronic serial number 125, from which one or more network addresses for the associated call center asset 105 are determined.

Figure 2A:
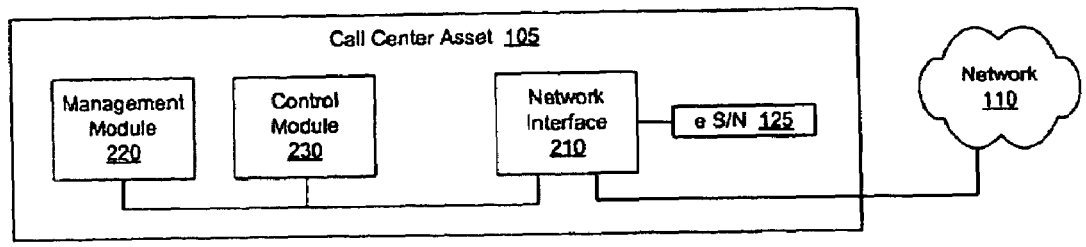
FIGS. 2A-D are diagrams of different embodiments of a generic call center asset, and perhaps its proxy device, having different levels of incorporated intelligence.

FIGS. 2A through 2D show several embodiments of a call center asset 105 having varying degrees of intelligence incorporated therein, generally decreasing from FIGS. 2A to 2D. In FIG. 2A, the call center asset includes a globally unique electronic serial number 125, which is used to identify the asset 105 on the network 110. In one embodiment, the electronic serial number 125 is the asset's Medium Access Control (MAC) address (described below); however, the electronic serial number 125 may be any number that is mappable to a network address.

The asset's electronic serial number 125 is available to a network interface 210. The network interface 210 is adapted to derive a network address for the asset 105 using the asset's electronic serial number 125. In a preferred embodiment, the network address derived from the electronic serial number 125 is unique on the network 110; however, in some implementations it may be desired that two or more call center assets share a network address. For example, the network interface 210 may be configured to create a network address based on the type of call center asset. Additionally, the network interface 210 may create multiple network addresses—for example, one unique network address for diagnostic and tracking purposes and another shared address for receiving broadcasts such as software updates and system-wide commands.

The network interface 210 is adapted to communicate over the network 110 using the network address that it derives for the asset 105. In one embodiment, the network interface 210 communicates over the network 110 using the Internet protocol (IP), wherein the network interface 210 uses the asset's MAC address or another globally unique address to derive its IP address using a mapping algorithm that preserves uniqueness. In another embodiment, the IP address may be assigned dynamically, such as with the Internet standard protocol Dynamic Host Configuration Protocol (DHCP). However, the network interface 210 may communicate using any of various protocols known in the art. For example, firmware updates may be sent to each individual device using unicast addresses, using for example the File Transfer Protocol (FTP), Transfer Control Protocol (TCP), or User Datagram Protocol (UDP). In other embodiments, firmware updates are sent to an entire collection of identical devices simultaneously by setting up a single multicast address on each of them and then broadcasting the software updates to all of the devices simultaneously. This method typically uses UDP and preferably ensures that all of the devices successfully received the entire update.

The call center asset 105 further includes a management module 220 and a control module 230, each coupled to the network interface 210. The central management computer 115 sends and receives communications to the management module 220 and control module 230 to implement the system's management or control functions (described below). The network interface 210 receives these communications from the central management computer 115 and routes them to the management module 220 and/or control module 230 as required. The network interface 210 also sends communications from the management module 220 and control module 230. The management module 220 is adapted to perform the management functions of the system, as described below, including tracking asset utilization and location, performing system diagnostics, and receiving software or firmware updates. The control module 230 is adapted to perform the control functions required by the system, as described below.

Figure 2B:
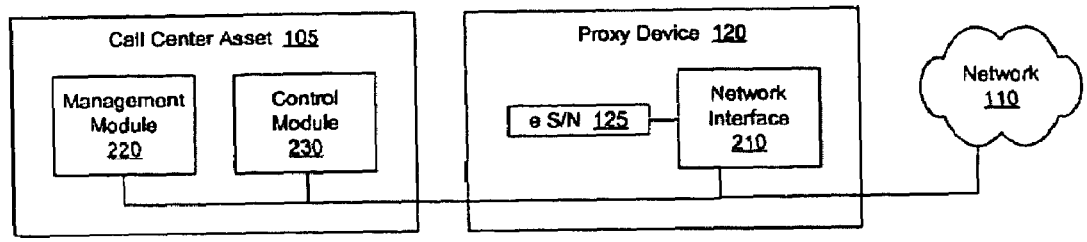

FIG. 2B is an embodiment of a call center asset 105 that uses a proxy device 120. In this embodiment, the proxy device 120 includes a network interface 210 for sending and receiving messages over the network 110. The network interface 210 may have access to an electronic serial number 125, as described above, for determining the asset's network address. The electronic serial number 125 may be on the proxy device 120 (as shown) or on the asset 105 itself. Alternatively, the network interface 210 may be adapted to determine a network address for the asset 105 without using an electronic serial number 125. For example, the network interface 210 may assign the asset's network address dynamically, after polling the network, or requesting an address from the central management computer 115 via DHCP for example. In this embodiment, the call center asset 105 includes the management module 220 and the control module 230 for performing the system functions, both of which communicate with the network interface 210 for sending and receiving messages from the central management computer 115.

Figure 2C:
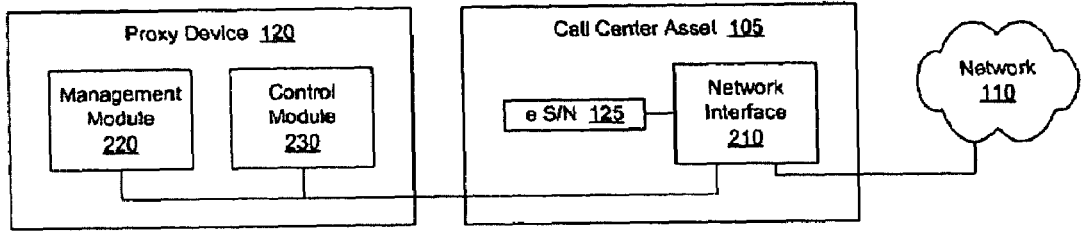

In the embodiment of FIG. 2C, the call center asset includes the network interface 210 and electronic serial number 125, as described, but uses a proxy device 120 for implementing the management and control functions. This embodiment may be useful to implement added management or control functions on existing call center assets that already include network capability. Accordingly, in an embodiment, both the call center asset 105 and the proxy device 120 may include a management module 220 and a control module 230. Proxies may thus be added to upgrade the functionality of the call center assets and the management and control system.

Figure 2D:
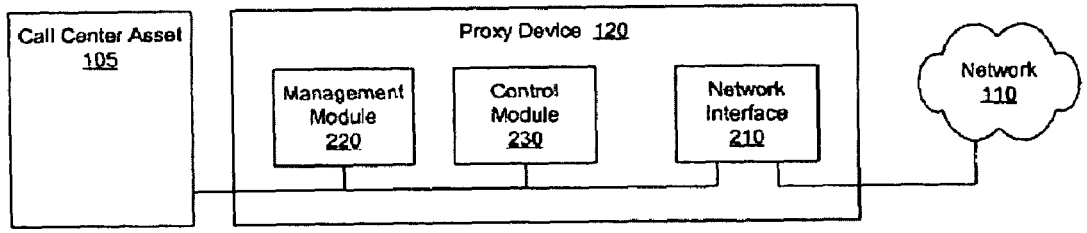

The embodiment of FIG. 2D depicts a "dumb" call center asset 105, which incorporates little or no intelligence for network capability or system functions. A proxy device 120, coupled to the asset 105, performs the management and control functions and communicates with the central management computer 115 for the asset 105. In one embodiment, the call center administrator sets up a pool of globally unique addresses allocated to the call center, such as the extended unique identifiers (EUI), as administered. Then, an asset is assigned one of these addresses, and the proxy that manages that asset is configured to recognize that address and associate it with management commands sent to that address.

These various embodiments for implementing intelligence in connection with a call center asset demonstrate the versatility of the system. New call center assets can be added to an existing system and can perform all of the functions required without additional hardware. In addition, existing legacy equipment, having little or no intelligence, can be used with the system by employing a proxy device (as shown in the embodiments of FIGS. 2A-D). Furthermore, the system can be upgraded by using proxy devices to implement additional system functions, without requiring a complete overhaul of an enterprise's call center assets.

2. Addressing a Call Center Asset on the Network

As discussed above, in one embodiment the network address of a call center asset 105 is determined from an electronic serial number 125. For example, in an embodiment of the network using the Ethernet protocol, an asset's network address can be derived from its Medium Access Control (MAC) address.

The Ethernet packet prefix consists of a preamble, a start code, a destination address, a source address, and the packet length field, followed by the packet payload and a CRC field. The source and destination addresses are each 48-bit values, known as MAC addresses, or "MAC-48" addresses. The Institute of Electrical and Electronic Engineers (IEEE) also refers to the MAC address as an "EUI-48" identifier. The MAC-48 address is composed of a 24-bit "Organizationally Unique Identifier" (OUI) and a 24-bit extension field:

MAC-48=[$OUI_{(0\ through\ 23)}$]|[$extension_{(0\ through\ 23)}$].

The OUI is a unique value that identifies the company or organization that manufactured the particular Ethernet interface. These OUI values are assigned and administered by the IEEE registration authority. For example, the OUI listed for Plantronics, Inc. in the IEEE/RA database is 00-03-89 (hexadecimal).

The extension field is a 24-bit value that can be assigned in any way the organization listed in the OUI field may choose. Under the IEEE standards, the organization is to ensure that each physical interface has a unique number; therefore, there will never be two interfaces that have the same combination of OUI and extension. This ensures a device's MAC-48 address will be a globally unique identifier, as there will never be another device anywhere in the world that has the same MAC-48 address. Advantageously, this globally unique identifier can serve as an electronic serial number for every device that a company manufactures, either directly or via a mapping scheme that is mathematically "one-to-one" and "onto." Using the MAC-48 address with a 24-bit extension field, an organization can manufacture up to 16,777,216 ($2^{24}$) physical devices having globally unique MAC addresses.

However, some larger companies are approaching this limit of shipped products with an Ethernet or other form of interface, which requires a globally unique identifier. (IEEE-1394 "Firewire" also uses the MAC-48 address as a globally unique identifier.) Therefore, these organizations require some way to expand beyond the 16-million device limit. There are two possibilities.

The first approach is to assign multiple OUIs to each organization that fabricates more than 16 million devices. From the IEEE Registration Authority's database, around 5,000 OUIs have already been assigned to various organizations, including the one for Plantronics, Inc. mentioned above. Since the OUI field is also 24 bits, there are also 16,777,216 possible OUIs, of which about 16,772,000 are still available. Organizations that produce more than 16-million devices may obtain an additional OUI, but this is a short-term solution. Any organization that has fabricated 16 million interface devices within the last 30 years is likely to use up a second allocation of 16 million MAC-48 addresses much sooner. Also, software designed to automatically manage all devices within an organization would have to be completely rewritten every time a new OUI is assigned to that organization, and all of the previous software presently operating in the legacy equipment would be incapable of recognizing devices with the new OUI.

Another embodiment uses a globally unique identifier that provides a larger extension field, such as the IEEE MAC-64 identifier, more recently referred to by the IEEE as the EUI-64. The EUI-64 is a 64-bit value consisting of two fields: the 24-bit OUI as described previously and a 40-bit extension field. This 40-bit extension field is large enough to accommodate up to 1,099,511,627,776 ($2^{40}$) different electronic serial numbers, which is expected to be several orders of magnitude greater than any single organization will ever need. It is noted:

EUI-48=MAC-48=[$OUI_{(0\ through\ 23)}$]|[$extension_{(0\ through\ 23)}$], whereas EUI-64=[$OUI_{(0\ through\ 23)}$]|[$extension_{(0\ through\ 39)}$].

However, EUI-64 identifiers are appropriate for IPv6 Internet protocols, as opposed to the more common IPv4 Internet protocols, which normally use EUI-48 identifiers. IPv6 is still in the process of being implemented through out the Internet backbone, but could be ubiquitous within the next few years.

A system in accordance with the present invention can be implemented initially using EUI-48 identifiers mapped to IPv4 Internet protocols and then generalized at a later time to EUI-64 identifiers using IPv6 protocols. With time, the IPv6 protocols should be more common on the Internet and the cost increment for an IPv6 protocol stack over the IPv4 stack on any product should decrease to the point that it becomes acceptable to switch over to IPv6.

In one embodiment, each call center asset is shipped from the manufacturer with its own electronic serial number, which is mappable to a globally unique network address such as an IP address. The asset may then be accessed from anywhere on a network, such as the Internet, via this address. However, many organizations prefer to assign IP addresses to all devices attached to their network from within their own assigned range of IP addresses. If a device supports the DHCP, then it can accept commands to assign it additional IP addresses. During what is referred to as the "discovery process," devices supporting DHCP announce their presence on the network at the time they are connected (either turned on or plugged in) and then a DHCP server assigns a "dynamic IP address" to this device from within the address range assigned to the organization. This is useful for "campus wide" asset management, in which broadcasts are sent to several assets.

The DHCP server may also assign the device a "group address," that all of the devices of a particular type can share. In this case all of the devices assigned that same group address can accept data packets sent to that group address. This is useful for "broadcasting" information to multiple devices at the same time. This is often used for streaming multimedia information to multiple users simultaneously. In a call center, for example, this could be used for broadcasting announcements to all of the telephones simultaneously. It can also be used for distributing software or firmware (software that is stored in non-volatile re-writable memory) upgrades to all of the devices at once. This capability is useful in a call center when the administrator wishes to upgrade the firmware in all of the assets of a particular type (e.g., all headsets) at once.

In another aspect of an embodiment, Internet Protocols (IP) and unique Medium Access Control (MAC) addresses, as used on Ethernet networks, are used to facilitate communications among the call center assets 105. Advantageously, using IP and MAC addresses provides physical layer independence. Physical layer independence means that the call center assets 105 can be coupled to a management and control computer 115 (and thus to the Internet) via a wide variety of data interconnect standards, including Ethernet (IEEE-802, including all variations), Token Ring, EIA-232, EIA-422, EIA-485, Universal Serial Bus (USB), IEEE-1394, Bluetooth, and modulator/demodulator (modem) signaling over the telephone circuit (using either in-band signaling where the data uses the same signal path as the audio or out-of-band signaling where the data uses separate signal wires, packets, or time slots). The in-band signaling can also be used during a telephone conversation by using the data signaling to modulate carrier frequencies either below or above the range of human hearing, such as the approach used for conveying DSL service over a telephone local loop.

The Internet Protocol requires a unique Internet address. This address may be preset and static, or it can be dynamic, whereupon a central registration server assigns the address whenever a new device announces its presence on the network. Ethernet networks operate by use of a unique network address at the Medium Access Control (MAC) layer, called the MAC address, which may or may not be related to the IP address. A typical implementation keeps the IP and MAC addresses independent for flexibility. The MAC address is usually a fixed value, established as a unique number at the time the network interface device is manufactured. As such, the MAC address can also be used as an electronic serial number for the device containing the network interface, either directly or via some translation algorithm that provides a one-to-one mapping. The MAC address should be unalterable, implemented by, e.g., a one-time programmable read-only memory, circuit board jumpers, or another similar mechanism.

The definitions of the MAC address and the IP address have addressing capability that permits call center implementations having billions of units. This functionality greatly increases the scalability of the call center asset management and control system. The Internet Protocol also permits the use of bridges, gateways, and the like to provide for the global interconnection of billions of units in widely separate locations into one worldwide connection, such as the Internet itself.

Because the Internet Engineering Task Force (IETF) documents the standards that comprise the Internet Protocol, these standards are well known and widely available. Furthermore, the popularity of the Internet ensures that many solutions from various vendors are available at varying prices and levels of performance.

The electronic serial number in each call center asset (or its proxy) can be used for asset tracking, which allows a call center manager to track call center assets that have been moved within the call center and to identify assets that are missing or defective. Moreover, the Internet Protocol can be used to convey commands from a management computer to provide any management functions, such as detecting whether a telephone is in use or other aspects of its state. The utilization of call center assets can thus be ascertained. The Internet Protocol can also be used to convey commands from a central management computer 115 to a call center asset for performing diagnostics. By combining these techniques using standard Internet programming software tools, custom applications can be produced to generate automated software packages for asset tracking, station utilization, and unit diagnostics. Furthermore, these functions can be performed by a call center manager or by another system coupled to the network. For example, the manufacturer of a particular call center asset, in addition to the call center manager, could diagnose the failure of the call center asset by communicating with it over the Internet.

In addition, as the equipment manufacturer improves the software or firmware that operates within a call center asset, the new version of the software or firmware could be made available to existing customers by transmitting it over the network to the relevant call center assets. For example, call center managers could update the software or firmware by downloading the latest version from the manufacturer's web or ftp site and then transmitting the new version to the relevant call center assets according to the desired upgrade schedule. Alternatively, the equipment manufacturer could perform the upgrade to the call center assets remotely over the network by transmitting the upgrades directly to the call center assets.

This might be facilitated by manual or automatic coordination between the manufacturer and the manager to avoid updating a piece of equipment while it is in use.

3. Full Ethernet Connectivity Call Station Embodiment

Figure 3:
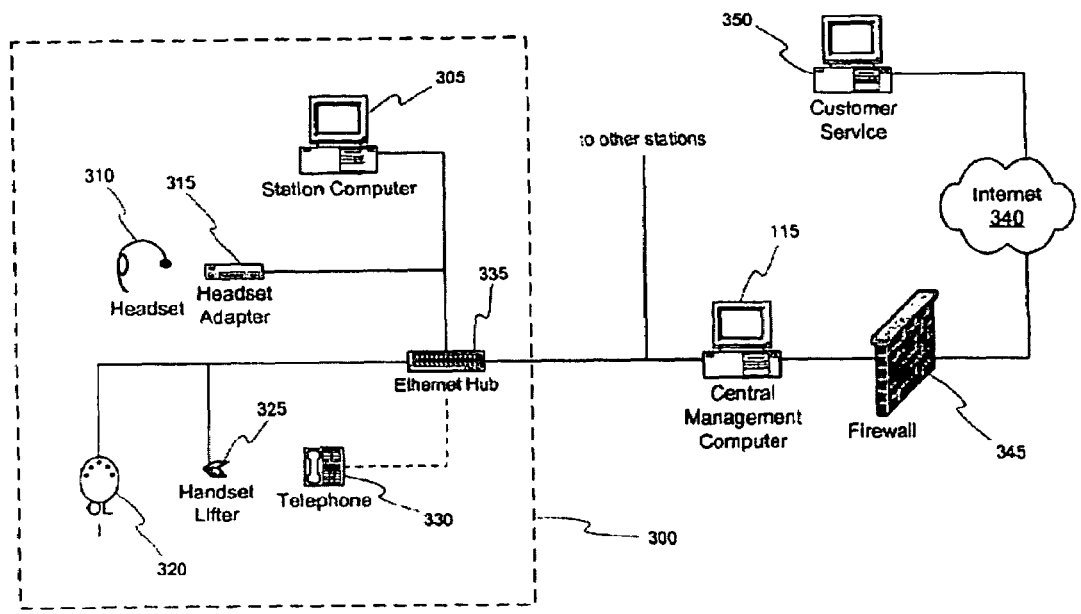
FIGS. 3-7 are diagrams of different embodiments of a physical layer interface implementation for connecting the call center assets of a station to a central management computer.

FIG. 3 illustrates one embodiment of a call center station 300. In this embodiment, connectivity is implemented by using Ethernet interfaces (e.g., IEEE-802, all types) to every call center asset in the station, as well as to either a station computer 305 located in the station or to a central call center computer. The call center assets accommodated in this embodiment include a headset 310, a headset adapter 315, an on-line indicator (OLI) 320, a handset lifter 325, and a telephone 330; however, any suitable telecommunications device could be used with the system. Each of the call center assets (the telephone 330 if Ethernet-enabled) and the station computer 305 are coupled to an Ethernet hub 330, which is coupled to the central management computer 115. The call center station 300 may have its own Ethernet hub 330, or it may share a hub 330 with other stations.

In addition, if call center connectivity to the Internet 340 is provided, additional security mechanisms, such as an Internet firewall 345, are preferably provided as well. Internet connectivity is commonly required for many call centers. In an embodiment, the central management computer 115 is communicatively coupled to a customer service computer 350 over the Internet 340. The customer service computer may be maintained by, for example, the manufacturer of one or more of the call center assets. Accordingly, the customer service computer 350 may supplement the call center management and control functions of the central management computer 115, which is typically operated by an enterprise. For example, the manufacturer of a particular call center asset could provide automatic software or firmware updates to each of an enterprise's call center assets using the customer service computer 350; thus, the call center administrator would not have to download the update from the manufacturer and perform the updates manually via the central management computer 115. Additionally, a manufacturer could retrieve data regarding utilization and diagnostics of the call center assets produced by the manufacturer, without having to retrieve this data from the enterprise.

4. Cost Effective Call Station Embodiment

Figure 4A:
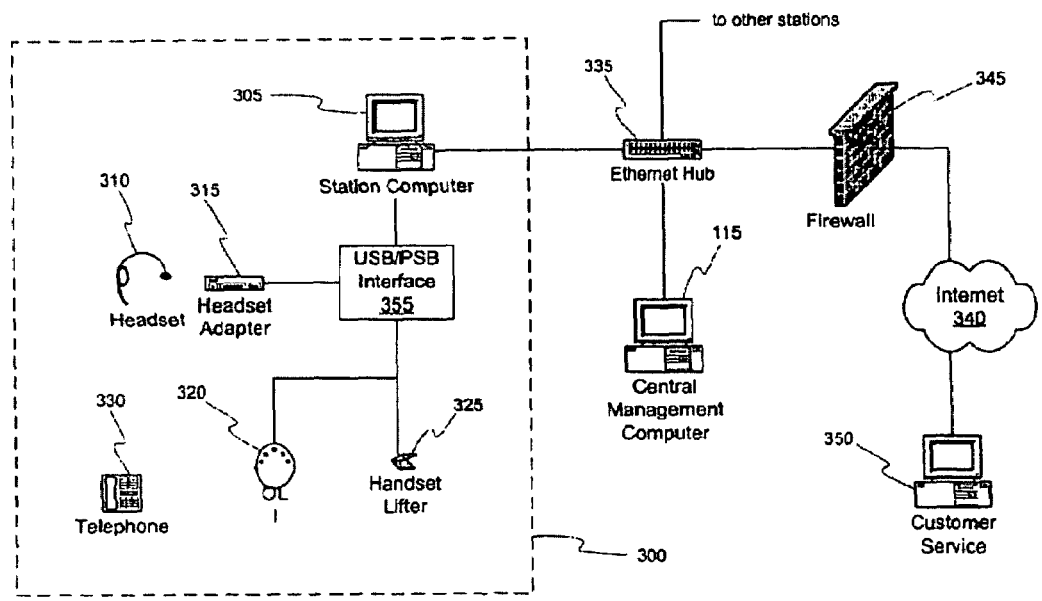
Figure 4B:
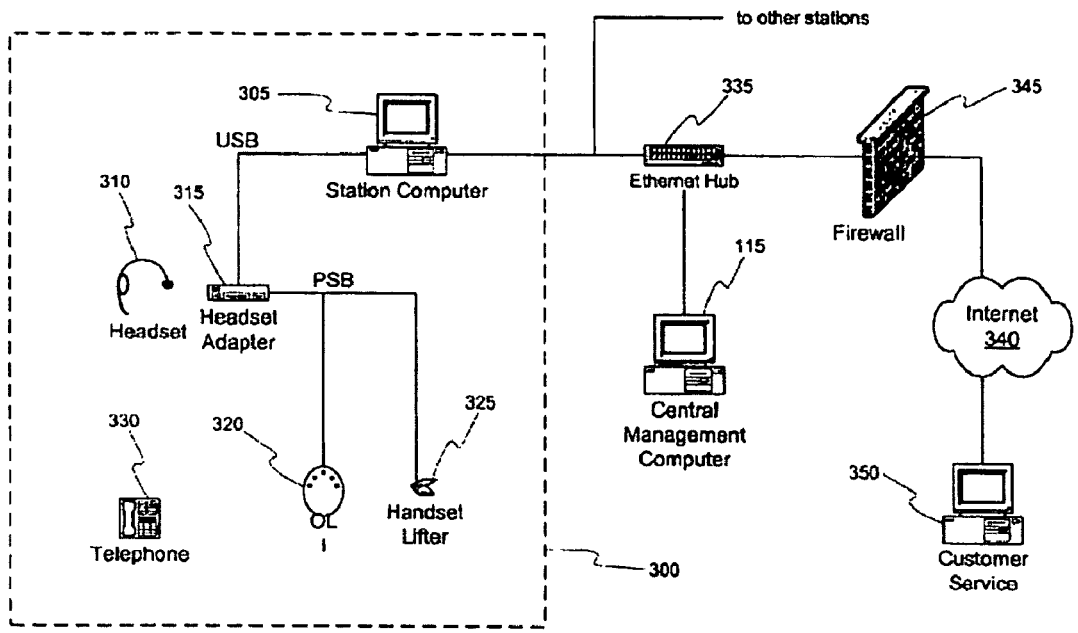

FIGS. 4A and B illustrate more cost effective embodiments than shown in FIG. 3. In these embodiments, a bi-directional, multi-drop connection is provided between the station desktop computer 305 and the other call center assets in the station, including some or all of: the telephone 330, the headset 310, the headset adaptor 315, the OLI 320, and the handset lifter 325. Examples of suitable interconnections include Universal Serial Bus (USB) and the Plantronics Serial Bus (PSB). The PSB is described in "Accessory Interface Bus." In the embodiment of FIG. 4A, a USB/PSB interface 355 is coupled between any call center assets that use the PSB format and the station computer 305 (which has a USB port). In the embodiment of FIG. 4B, the headset adapted 315 incorporates the USB to PSB interface functionality. The station computer 305 is configured with an Ethernet interface and is used as a gateway between the call center assets and the central management computer 115, and possibly to the Internet 340.

The USB to PSB interface 355 can be a separate device, as shown in FIG. 4A, or it can be incorporated into the headset adapter, as shown in FIG. 4B. Alternatively, the USB interface may be routed to all of the connected devices. The choice of network media is an economic decision that is driven by the relative cost of implementation and does not materially affect the substance of the invention.

This cost effective solution provides an upgrade path for existing call centers having a large investment in legacy equipment. By providing an interface between the station desktop computer 305 and the control bus used by the existing equipment, the desktop computer 305 operates as a network proxy for the other instruments in the station, translating Internet Protocols to the native protocols of the legacy equipment control bus. However, because the existing legacy instruments may not provide a unique electronic serial number, the proxy may have to simulate one or otherwise determine a network address for its associated asset.

5. Audio Signaling Call Station Embodiment

Figure 5:
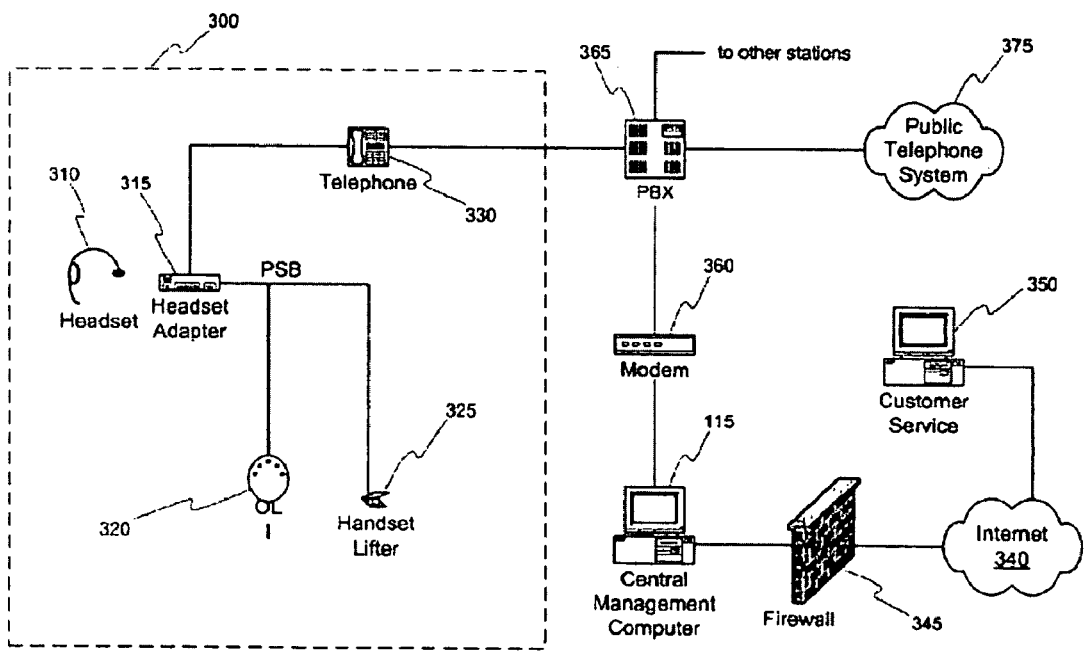

In the embodiment of FIG. 5, an interface is provided that multiplexes the data signaling into the telephone audio path itself. The telephones 330 of each call center station 300 are coupled to the central management computer 115 by a private branch exchange (PBX) 365. The PBX 365 switches calls within an enterprise between stations 300 on private lines while allowing the stations 300 to share a number of public telephone lines. The central management computer 115 modulates data packets to the call stations 300 using a modem 360, implemented either separately or via software operating on the same processor used to interpret the Internet Protocol packets.

The data packets can be implemented "in band" (within the telephony audio frequency range), "out of band" (outside the telephony audio frequency range), or both. In the embodiment where the signaling is performed "in-band," the headset adapter 315 senses the existence of modem signaling on the audio line, mutes the audio, and demodulates the incoming data packet. In this case, the management and control functionality can only be implemented when the telephone 330 is not in use. In the "out of band" signaling embodiment, data communications are allowed while the telephone is in use. This approach is used in Digital Subscriber Line (DSL) modems, as described in ITU-T Recommendation G.991.2, "High bit rate Digital Subscriber Line (HDSL) transceivers." A DSL modem, either as a separate piece of equipment or incorporated into the telephone, can be used for this application.

This embodiment permits both corded and cordless headsets to be managed using equipment that is backwards compatible with existing legacy equipment. In the cordless case, many wireless headset technologies, such as Bluetooth and DECT, use digital radio links between the base and the headset. These digital radio systems usually provide an alternate path for the transmission of digital data between the base and the headset. Therefore, even though the telephone link may be used for the IP-based data communications with a remote device over the Internet, the local IP-based data communications between the headset adapter and the wireless headset typically uses a parallel digital channel, not the audio channel. This keeps the modem function in the headset adapter, rather than requiring a modem function in the headset itself. In one embodiment, the modem function is incorporated into the headset adapter 315, or alternatively the headset 310. In the latter case, the headset 310 would be a manageable device without affecting its plug-in compatibility with the existing call center equipment.

While many call centers have a computer system in each station to run customer management software for the agent's convenience, this embodiment does not require one. This avoids the additional cost of a computer system located in each call center station. Also, in some instances, call center managers may not wish to provide each station with a computer. Advantageously, the asset management and control does not depend on the proper operation of the station computer, which increases the reliability of the system.

6. VoIP Signaling Call Station Embodiment

Figure 6A:
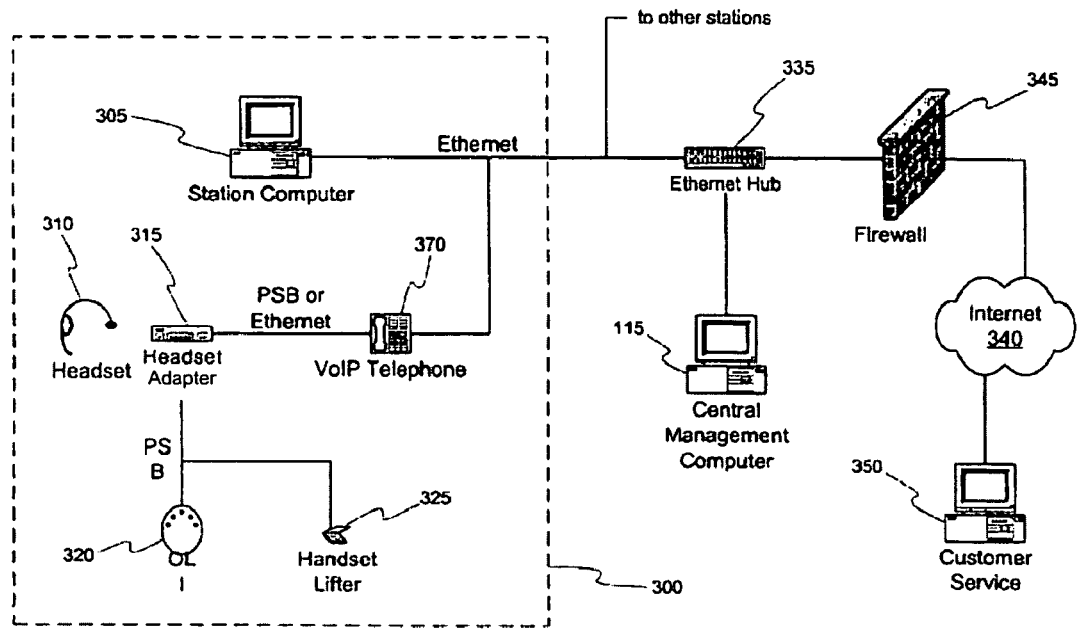
Figure 6B:
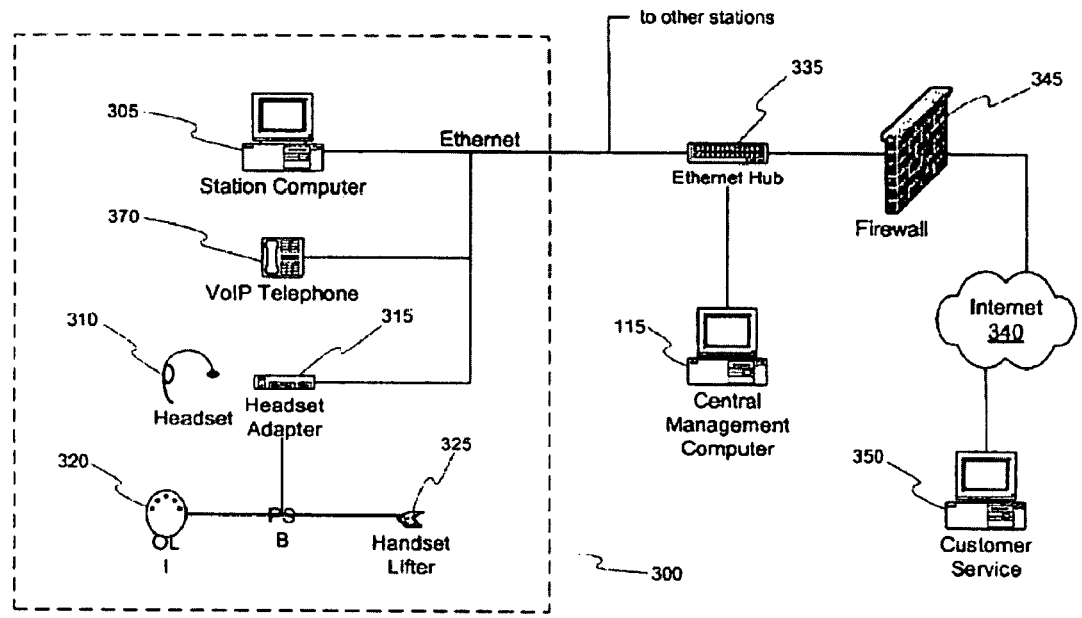

FIGS. 6A and 6B show other embodiments, wherein a headset adapter 315 is coupled to a Voice over IP (VoIP)

telephone 370. Examples of commercially available VoIP telephones include models 2002, 2004, 2050 from Nortel Networks, Inc.; model 4612 from Avaya Inc.; and model 7960 from Cisco Systems, Inc. Here, the VoIP telephone 370 connects, via a data network supporting Internet Protocols, to the central management computer 115. In FIG. 6A, the call center assets are implemented directly as IP devices (such as ITU-T Recommendation H.323 terminals or IETF RFC 3261 SIP User Agents) and are connected to the VoIP telephone 370 directly or via the headset adapter 315.

In FIG. 6B, the headset adapter 315 serves as a gateway for the other call center assets. In an embodiment, the headset adapter 315 includes a network interface of any type, including but not limited to: IEEE 802.3 CSMA/CD, IEEE 802.4 Token bus, IEEE 802.5 Token ring, IEEE 802.11 Wireless Local Area Network (WLAN), IEEE 802.15 Wireless Personal Area Network (WPAN), and IEEE 802.16 Broadband wireless access. These other call center assets, including the headset 310, OLI 320, and handset lifter 325, communicate with the headset adapter 315 using an interconnection such as USB or PSB. Because the call center assets do not communicate through the telephone 370, this embodiment is also compatible with an analog telephone station.

7. Other Physical Layer Interface Embodiments

Figure 7:
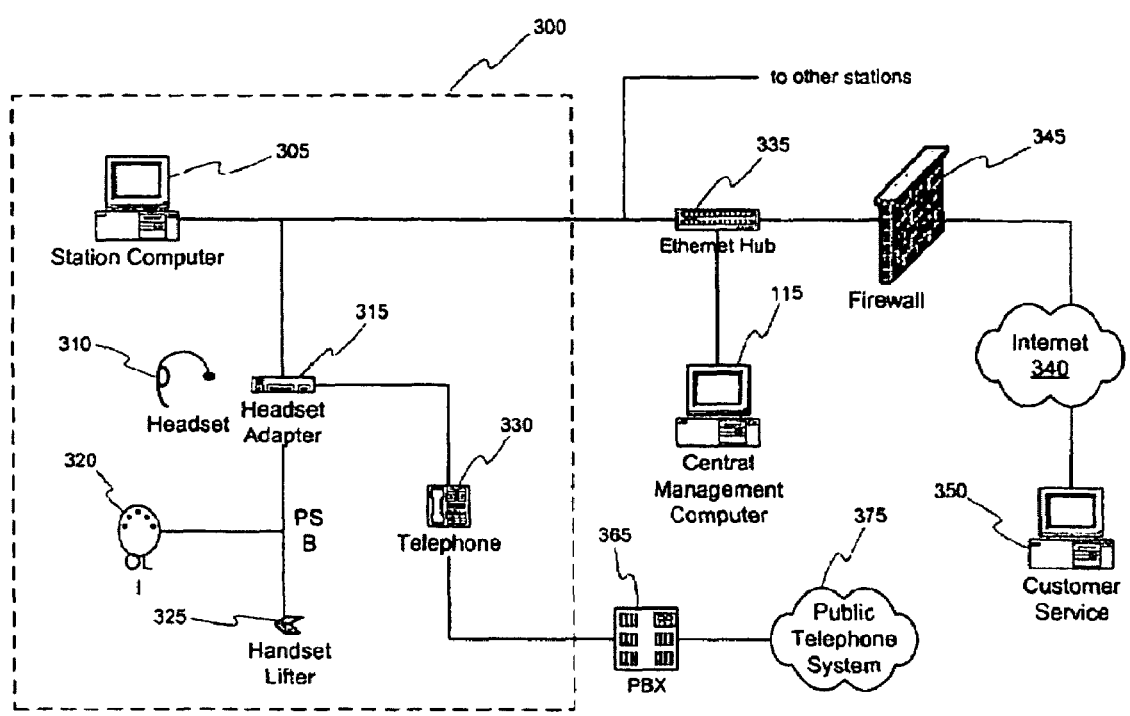

FIG. 7 shows yet another embodiment, wherein the headset adapter 315 serves as a gateway for the other call center assets to the central management computer 115. The headset adapter 315 is also coupled to a telephone 330, which communicates with a public telephone system 375 via a PBX 365. In this embodiment, the voice and data paths to are split at the headset adapter 315.

In other embodiments, the headset adapter serves as a proxy, translating IP packets into any proprietary protocol known by the accessories (similar to the address translation services provided by an ITU-T Recommendation H.323 compliant gateway function).

Call center assets that provide a unique electronic serial number can be tracked according to either (1) a directly mapped IP address; (2) via an IP address mapped by the headset adapter; or (3) the VoIP telephone, acting as an IP proxy. The IP proxy can manage communications to accessories that do not have a unique electronic serial number by simulating appropriate numbers, but the asset management and control functionality of those accessories would be complicated by the need to manage the proxy's simulated serial numbers.

The IP control traffic for any of the call center assets can be implemented either as VoIP data, such as an ITU-T Recommendation T.120 data packet, or as a separate IP data stream. This is the functional equivalent of in-band signaling and out-of-band signaling for VoIP applications.

Similar implementations are possible via ISDN or similar switched circuit telephony equipment. The appropriate mapping of the IP packets onto the switched circuit interface is required. Such mappings are defined by international telephony standards.

B. Applications to Asset Management and Control

Accordingly, call center and office telephony assets, such as the embodiments described in connection with FIGS. 2A through D, can be managed and controlled over a network by a remote system, as shown in FIG. 1. Depending on the design specifications and system requirements, any of a number of methods for coupling the assets to the network can be used. FIGS. 3 through 7 illustrate several embodiments of a physical layer interface for connecting call center assets to a central management computer. Once a central management computer is provided with connectivity to a number of assets having suitable intelligence, an operator using the computer can perform various tasks regarding the management and control of these assets.

Importantly, the network gives the operator a great deal of flexibility to manage and control the assets from any number of physical locations, and it enables the operator to manage and control assets at a number of different locations.

To effect asset management, an asset's management module 220 preferably uses a high-end protocol that is known to the network interface 210 and the computer 115. Likewise, to effect asset control capabilities, the control module 230 uses a high-end protocol that is known to the network interface 210 and the computer 115. An example of a suitable protocol for communicating with call center and office telephony assets is described in "Accessory Interface Bus." This protocol defines a command set and associated response packets for managing and controlling one or more assets; however, this command set may be expanded or modified depending on the assets supported and desired functionality.

1. Asset Management: Asset Utilization

In one embodiment, the central management computer 115 monitors the utilization of one or more assets 105 over the network. An asset's utilization may include whether the asset is in use, the type of use, or its use history. For example, the utilization for a telephone may be defined as whether there is an active call on each of the telephone's lines, and whether each active call is on hold. The utilization of a headset or headset adapter may be defined as whether the asset is currently carrying a call.

In an embodiment, the asset 105 includes a management module 220 programmed to detect and report on the asset's utilization. Responsive to a request from the network interface 210, the management module 220 sends the network interface 210 a signal indicating the asset's utilization. At predetermined intervals or responsive to specific requests from the central management computer, the network module 210 sends data relating to the asset's utilization to the central management computer. The central management computer may query the assets on a daily, weekly, or monthly basis.

In another embodiment, the asset's management module 220 includes software for logging utilization statistics. At predetermined intervals or responsive to specific requests from the central management computer, the network module 210 sends this logged data to the central management computer. After the data are transmitted, the management module 220 preferably clears the data from memory for storing additional utilization data.

In another embodiment where a headset supports IP functions, the PBX or VoIP router detects when a user disconnects the headset from the system. The system detects the disconnection, e.g., by periodically polling the headsets and receiving replies. If no reply is received, the system assumes the headset has been disconnected. The ACD is then notified of the disconnection, allowing the ACD to avoid routing future calls to the associated station. When a user reconnects a headset, the system detects that the headset is connected, e.g., because the headset replies to periodic polls. The system notifies that the headset is connected, and the ACD may thereafter resume routing telephone calls to that station.

2. Asset Management: Asset Location

The system also enables an operator to identify the specific location of a particular managed asset using the network. In one embodiment, the central management computer uses the asset's IP address to locate it. In an embodiment, the central management computer sends an echo message, as per the Internet Control Message Protocol (ICMP), defined in IETF RFC 792, with the ICMP-defined "Time To Live" field set to "1." This limits the number of network hops to a single hop, causing the first intermediate device in the path to answer the echo message back to the central management computer with its address. The central management computer then repeats the echo message to the asset's IP address with the "Time To Live" field set to "2," which causes the second node device to respond to the echo message with its address. This process is repeated, incrementing the "Time to Live" field each time until either the address of interest is reached or until some predefined limit is reached. If the predefined limit is reached before finding the desired asset's address, it is assumed that the asset is not available on the network. Once the asset's IP address has been reached, the echoed addresses of the repeated echo replies provide a linear map of the path to the desired asset, which can be used to infer the device's physical location by knowing, a priori, the connection topology of all of the assets and the nodes to which they attach. The intermediate devices, specifically Internet routers, may be network assets under the control of the network administrator, or they may be part of a larger network, such as the backbone routers to the Internet itself.

When the management computer receives the echoed message, the computer searches through the list of intermediate devices, comparing it against the database of all of the network devices under its management. By knowing the location of the intermediate devices and mapping the path of the message according to the physical locations of the devices, the central management computer has determined the location of the asset.

3. Asset Management: Diagnostics

Using the central management computer, an operator can also perform various diagnostic tests over the network to verify the proper operation of a specific asset. Diagnostic tests may be performed periodically via a preprogrammed automatic function within the management computer, or they may be performed manually responsive to commands of a human operator using the central management computer. In addition, a group of assets (e.g., all headsets) can be tested simultaneously by broadcasting diagnostic commands to the group of assets.

In one embodiment, the management computer sends a diagnostic command over the network to an asset using the asset's network address. The network module 210 of the asset having that network address receives the diagnostic command, and forwards the command to the management module 220. Responsive to this command, the management module 220 performs the requested diagnostic operation. Typically, the diagnostic command is specific to the type of asset (e.g., headsets), and any of a variety of diagnostic operations can be performed.

After performing the diagnostic test, the management module 220 passes the result of the test to the network module 210, which sends the result over the network to the central management computer. The result may be, e.g., an indication that the diagnostic operation passed or failed. If the diagnostic operation failed, the result may also include some ancillary information regarding the nature of the failure. This ancillary information may be in the form of human-readable descriptive text or an error code, which the management computer checks against a database of error codes explaining the failure and what corrective action should be taken. The management computer preferably initiates the corrective action automatically or signals a request for corrective action to an operator. If the central management computer does not receive a reply within a predetermined timeout period, it is assumed that the asset has failed or that there is a network failure.

4. Asset Management: Software or Firmware Updates

The system also enables the central management computer to perform software or firmware updates over the network for a specific asset or a set of assets of like type (e.g., all headset adapters). In one embodiment, the central management computer distributes the updates to each asset within its management domain one device at a time, e.g., using File Transfer Protocol (FTP), Transport Control Protocol (TCP), or User Datagram Protocol (UDP).

In another embodiment, the central management computer distributes the update to all assets of like type by previously setting up a multicast network address and associating each device with this multicast network address. In an embodiment, the software or firmware update is sent to the multicast network address, to which a set of assets responds. The network module 210 associated with each asset in the set is adapted to save the software or firmware update payload into a reserved part of memory.

In one example, after the update is saved in the memory, the management computer commands the assets to reinitialize using the new software or firmware, broadcasting this command to the same multicast network address or to each asset individually. Once this is accomplished, the management computer preferably verifies the proper update software or firmware by querying each asset's software or firmware version number. If an asset does not reply with the new version number, the management computer preferably attempts to update the software or firmware again, addressing only those assets that were not updated. Preferably, if the management computer fails to update the software or firmware of a particular asset a given maximum number of times, an error message is forwarded to the operator and the management computer stops trying to update the asset.

5. Asset Control

In addition to asset management, the system enables the active control of assets coupled to the central management computer via the network. In one embodiment, when the ACD routes a call to an individual telephone in a call station, the system sends commands to the station's handset lifter to lift the handset. In another embodiment, the ACD sends commands to the on-line indicator (OLI) associated with that telephone to indicate that the user is presently engaged in a telephone conversation. For example, the system may send a command to change the lighting pattern of the OLI to indicate the appropriate status of the call.

C. Protocol Layers on the Internet

The definition of the Internet consists of a set of protocol layers, roughly following the ISO seven-layer Open Systems Interconnect (OSI) Reference Model (OSI/RM), as per ISO/IEC 7498-1: 1994. The layers of interest in this discussion are as follows:

1 OSI Layer Protocol Standard 1 Physical Layer 10/100BaseT IEEE 802.3 2 Data Link Layer CSMA/CD & IEEE 802.3 & IEEE 802.2 LLC 3 Network Layer IPv4, IPv6 IETF RFC791, RFC2460 4 Transport Layer UDP, TCP, FTP IETF RFC768, RFC793, RFC959 5 Session Layer RTP IETF RFC1889, RFC1890 6 Presentation Layer VoIP ITU-T Rec. H.323

At the Physical Layer, the most common interconnect used for Internet communications is the Ethernet standard, using either 10 BaseT (10 Mbps signaling) or 100 BaseT (100 Mbps), as per IEEE 802.3. Indeed, a standard cable modem or DSL modem used for Internet access connects to the computer via either a 10 BaseT or 100 BaseT interface. These interfaces use the ubiquitous RJ-45 connector with twisted pair cable. A new version of the Ethernet standard is available that supports 1,000 Mbps, and there are plans for a 10,000

Mbps version. Similarly, wireless versions, as per IEEE 802.11, IEEE 802.15, and IEEE 802.16, are either available or planned.

At the Data Link Layer, the Ethernet standard uses Carrier Sense Multiple Access with Collision Detect (CSMA/CD), as per IEEE 802.3. With CSMA/CD, when an interface wishes to transmit a packet, it listens on the network to see if something else is transmitting (Carrier Sense). When it detects that the network is quiet, it begins to transmit the packet. To guard against two devices' beginning to transmit at the same time, the interface listens to the network while it is transmitting. If the interface detects an interfering signal on the network, it stops the transmission and waits a random number of milliseconds before attempting to retransmit (Collision Detect). A variation, called CSMA/CA (Collision Avoidance), is used for wireless networks, as described in IEEE 802.11.

At the Network Layer, the Internet Protocols provide the packet addressing and routing information to ensure that the packet can reach the destination through the Internet. There are two versions of the Internet Protocol, known as IPv4 and IPv6, for version 4 and version 6 respectively. The main difference between these two versions is the Internet address space. IPv4 uses 32-bit addresses, and IPv6 uses 128-bit addresses; therefore, the IPv4 address space is a subset of the much larger IPv6 address space. The change from IPv4 to IPv6 was required because every device in the Internet requires a unique IP address, and the explosion in popularity of the Internet would exhaust the supply of available 32-bit addresses.

At the Transport Layer, the control stream may use either UDP datagrams or TCP connections. User Datagram Protocol (UDP) is a one-way protocol, sending "datagrams" in one direction. The protocol itself does not maintain any form of connectivity with the destination device, nor does it necessarily expect any kind of response from the destination device. Transmission Control Protocol (TCP) establishes a virtual "connection" over the Internet with the destination device. TCP maintains this connection by occasionally polling whether the other device is still available. TCP also expects a reply for every packet it sends to the destination device, which serves as a confirmation of receipt. If such a reply is not received within a certain amount of time, the packet is resent.

For VoIP applications, there are several separate data streams: the video and audio data streams and the control streams. IP control of assets in a call center that uses analog telephones only requires the control stream.

VoIP applications normally use UDP datagrams for the video and audio streams because they require less processing overhead and because the delays involved in retransmitting a lost packet, as with TCP, are too long for two-way telephony applications. If a UDP packet is lost, then the receive device recovers the best it can, perhaps invoking some type of best guess image or acoustic reconstruction strategy.

At the Session Layer, VoIP applications normally use the Real-Time Protocol (RTP) for the delivery of the video and audio information. RTP is based on UDP datagrams for the reasons mentioned above.

A variant of the protocols at the Network Layer, Transport Layer, and Session Layer is the Robust Header Compression (RHC) method, described in IETF RFC 3095. In this variant, the IP, UDP, and RTP protocol headers are combined and compressed to reduce the header overhead to the data packets used to convey the audio telephony information.

At the Presentation Layer, the VoIP protocols specified in ITU-T Recommendation H.323 are used to encode and decode the video and audio signals associated with the session.

D. Application to a Wireless Headset

Figure 8:
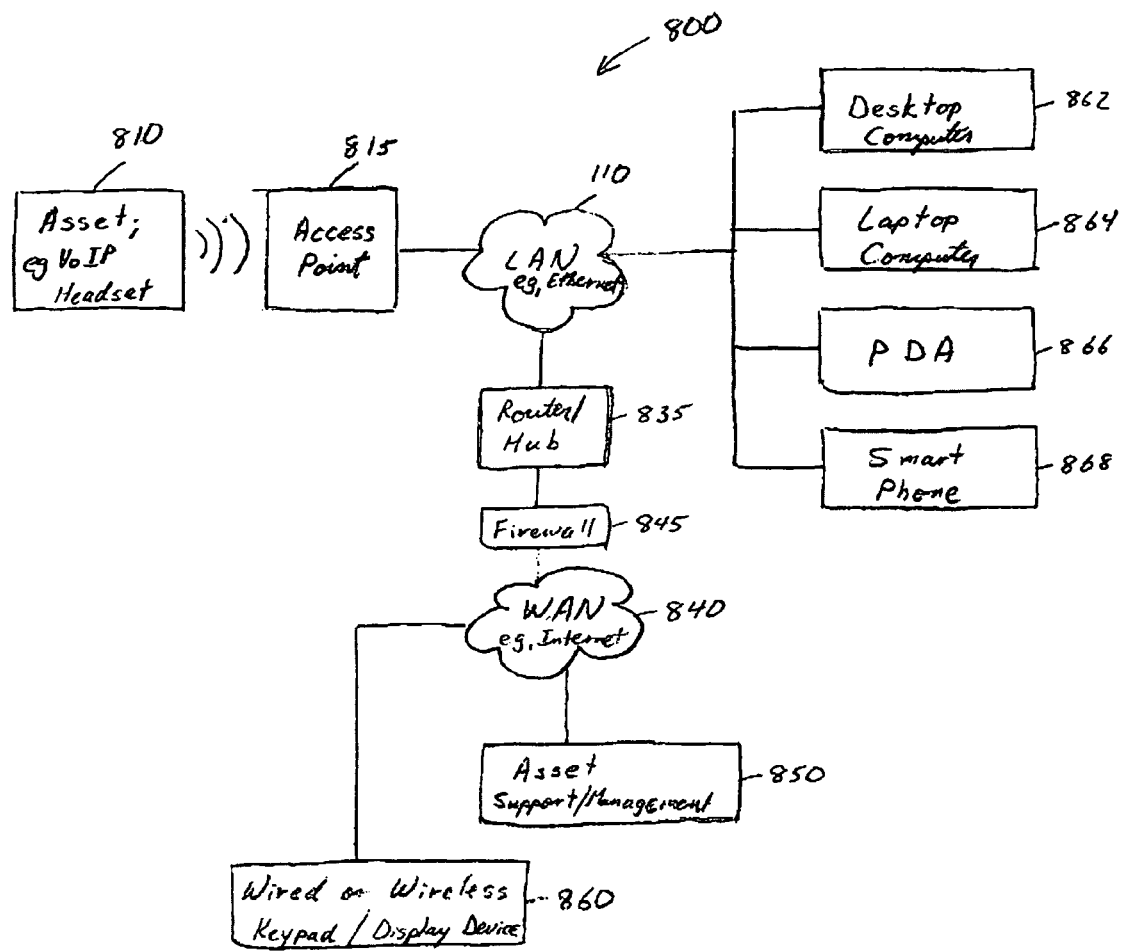
FIG. 8 is a diagram of a wireless headset management and control system in accordance with another embodiment of the present invention.

Referring now to FIG. 8, a wireless headset management and control system 800 is shown in accordance with another embodiment of the present invention. System 800 includes a wireless headset 810 (e.g., a wireless VoIP headset) operably coupled to a LAN 110 (e.g., an Ethernet) via an access point (AP) 815. Wireless headset 810 and AP 815 are able to support wireless fidelity (WiFi) in general, and the IEEE 802.11 wireless networking standard in particular, but other protocols for wireless communication are within the scope of the present invention.

Communication devices including a keypad, a display, and a World Wide Web (Web) browser, such as a desktop computer 862, a laptop computer 864, a personal digital assistant (PDA) 866, and a smart phone 868, are operably coupled to LAN 110 via a wired or wireless connection. Also included in system 800 is a router/hub 835 operably coupled to LAN 110, and an optional firewall 845 between LAN 110 and a wide area network (WAN) 840 (e.g., the Internet). A communication device 860 including a keypad, a display, and a Web browser and a headset support/management service computer 850 may be operably coupled to WAN 840. Various communication devices 860 including a keypad, a display, and a Web browser may be used and are commercially available. Service computer 850 may be maintained by, for example, the manufacturer of the headset. Accordingly, the service computer may supplement the control or management functions over the headset. For example, the manufacturer could provide automatic software or firmware updates to the headset or retrieve headset data regarding utilization and diagnostics using the service computer 850.

Figure 9:
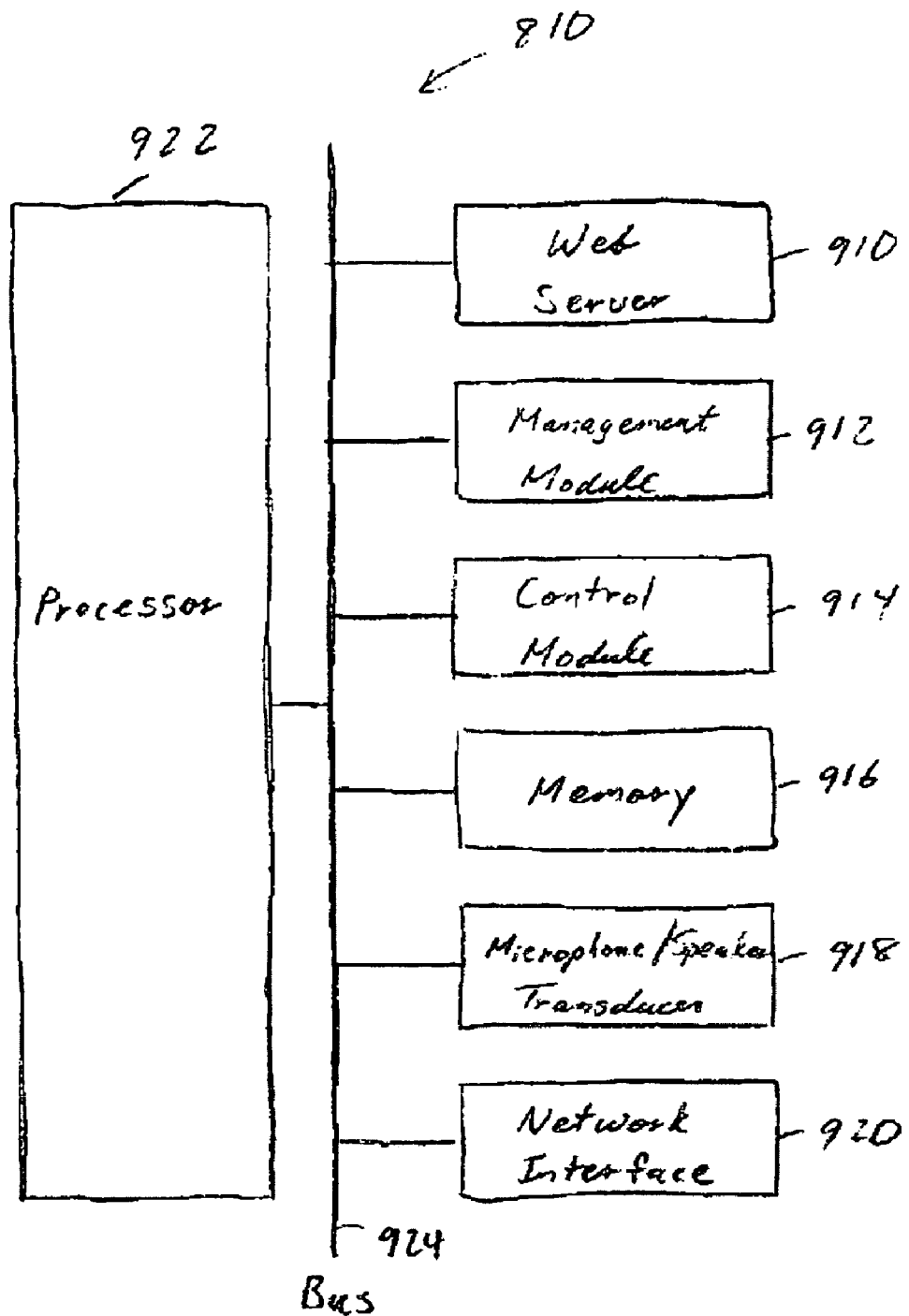
FIG. 9 is a diagram of a wireless headset in the system of FIG. 8 in accordance with an embodiment of the present invention.

Referring now to FIG. 9 in conjunction with FIG. 8, a block diagram of wireless headset 810 is shown in accordance with an embodiment of the present invention. Headset 810 includes a Web server 910, a management module 912, a control module 914, a memory 916, a transducer 918, and a network interface 920 operably coupled to a processor 922 and one another via a bus 924. Other connectivity and configurations are within the scope of the present invention. Processor 922 and memory 916 implement a HyperText Markup Language (HTML) or Extensible Markup Language (XML) based Web server 910, in one example, which is used to serve headset control and management Web pages over LAN 110 and WAN 840. In one embodiment, an IEEE 802.11 compliant chipset may be used for providing the Web server.

Management module 912, control module 914, and network interface 920 are similar in function and characteristic to management module 220, control module 230, and network interface 210 described above with respect to FIGS. 1 through 7 and repeated descriptions are omitted. Modules 912 and 914 are capable of receiving and sending information for the management and control of headset 810, respectively. Network interface 920 is adapted to derive a network address for the headset using the headset's electronic serial number, which is used to identify the headset on the network. In one embodiment, the electronic serial number may be the headset's Medium Access Control (MAC) address; however, the electronic serial number may be any number that is mappable to a network address. Network interface 920 is adapted to communicate over LAN 110 using the network address that it derives for the headset. In one embodiment, network interface 920 is able to transmit and receive digital and/or analog signals, and in one example communicates over LAN 110 using IP, wherein the network interface uses the headset's MAC address or another globally unique address as its IP address. In particular, network interface 920 may be operably coupled to LAN 110 via the IEEE 802.11 protocol. However, the network interface 920 may communicate using any of various protocols known in the art for wireless connectivity.

Information may then be exchanged bi-directionally between the headset control/management Web pages and Web server 910, which is in bi-directional communication with management module 912 and control module 914, to implement the system's management or control functions as described above (with respect to Section B. Applications to Asset Management and Control) and below.

Accordingly, system 800 allows for wireless headset 810 to be operably coupled to LAN 110 and WAN 840 such that communication devices 860, 862, 864, 866, or 868 may be used to control and/or manage headset 810 with data and information uploaded to Web server 910 and/or downloaded to the communication device.

The Web pages served by Web server 910 may include fields for the following control functions:
1) IP address or URL of the destination device for a VoIP phone call;
2) IP address of the SIP proxy, etc.;
3) Voice quality, such as enabling/disabling various audio DSP functions;
4) Volume, such as the receiving signal volume;
5) Transmit audio mute; and
6) Ring tones.

The Web pages may further display performance metrics, such as the following:
1) Receive Signal Strength Indication (RSSI) of the signal on the headset from the Access Point (AP);
2) Transmit and receive audio buffer fullness, etc.;
3) Call session information (e.g., duration, etc.);
4) Access Point availability (link management); and
5) General location via AP information (e.g., E911 applications).

Advantageously, headset 810 can be controlled or managed by any wired or wireless communication device on LAN 110 or WAN 840 that includes a display, a keypad, and an HTML or XML based Web browser, such as a desktop computer 862, a laptop computer 864, a personal data assistant (PDA) 866, a smart phone 868, or any other applicable communication device 860. The Web browser interface is standardized according to the Internet Engineering Task Force (IETF) standards for HTML and XML, such that any device with a standard Web browser can be used to provide the user interface for managing and/or controlling the headset, such as dialing, address lookup, call holding, call transferring, and various other headset functions. Thus, the present invention provides a very rich graphical user interface (GUI) for managing and/or controlling a wireless headset of any size and does not require adding extra buttons, switches, or other user interface means, advantageously reducing the size and the cost of the headset.

Furthermore, as noted above, remote support and/or management of the headset, for example by a third party service computer 850, is also possible in accordance with the present invention. Emergency services for E911 may also utilize the present invention to monitor remotely the general location of the user via the AP information to determine/map the user's location.

Embodiments described above illustrate but do not limit the invention. It should also be understood that numerous modifications and variations are possible in accordance with the principles of the present invention. For example, the wireless headset of the present invention is not limited to a call center location. Accordingly, the scope of the invention is defined only by the following claims.

We claim:

1. A wireless headset, comprising:
a network interface for wirelessly coupling to a network using the Internet Protocol;
a World Wide Web (Web) server for providing a Web page over the network to control or manage the wireless headset; and
a module operably coupled to the Web server for performing a function on the wireless headset.

2. The headset of claim 1, wherein the network interface utilizes a protocol selected from the group consisting of IEEE 802.3, IEEE 802.11, IEEE 802.15, and IEEE 802.16.

3. The headset of claim 1, wherein the network is a local area network or a wide area network.

4. The headset of claim 1, wherein the Web server is HyperText Markup Language (HTML) or Extensible Markup Language (XML) based.

5. The headset of claim 1, wherein the Web page displays a performance metric selected from the group consisting of a Receive Signal Strength Indication (RSSI) from an Access Point (AP), AP availability, AP location, transmit and receive audio buffer fullness, and call session information.

6. The headset of claim 1, wherein the module is for performing a control function on the wireless headset, the control function selected from the group consisting of control over Universal Resource Locator (URL), telephone number, IP address, volume, voice quality, mute, ring tone, dialing, address lookup, call hold, and call transfer.

7. The headset of claim 1, wherein the module is for performing a management function on the wireless headset, the management function selected from the group consisting of headset utilization, location determination, performance diagnostic, and software or firmware update.

8. A wireless headset system, comprising:
a wireless headset including a World Wide Web (Web) server operably coupled to a network using the Internet Protocol and a module operably coupled to the Web server for performing a control function or a management function on the wireless headset;
a Web page provided by the Web server and available on the network; and
a communication device including a keypad, a display, and a Web browser for sending information over the network from the Web page to the Web server to control or manage the wireless headset.

9. The system of claim 8, wherein the network is a local area network or a wide area network.

10. The system of claim 8, wherein the Web server is HyperText Markup Language (HTML) or Extensible Markup Language (XML) based.

11. The system of claim 8, wherein the Web page displays a performance metric selected from the group consisting of a Receive Signal Strength Indication (RSSI) from an Access Point (AP), AP availability, AP location, transmit and receive audio buffer fullness, and call session information.

12. The system of claim 8, wherein the Web page displays a control function selected from the group consisting of control over Universal Resource Locator (URL), telephone number, IP address, volume, voice quality, mute, ring tone, dialing, address lookup, call hold, and call transfer.

13. The system of claim 8, wherein the Web page displays a management function selected from the group consisting of headset utilization, location determination, performance diagnostic, and software or firmware update.

14. The system of claim 8, wherein the communication device is selected from the group consisting of a desktop computer, a laptop computer, a personal digital assistant, and a smart phone.

15. A method of controlling or managing a wireless headset, the method comprising:
- providing a wireless headset including a World Wide Web (Web) server and a module operably coupled to the Web server for performing a control function or a management function on the wireless headset;
- serving a Web page over a network using the Internet Protocol via the Web server;
- providing a communication device including a keypad, a display, and a Web browser; and
- uploading information to the Web server via the communication device to control or manage the wireless headset.

16. The method of claim 15, wherein the uploaded information is selected from the group consisting of Universal Resource Locator (URL), telephone number, IP address, volume, voice quality, mute, and ring tone.

17. The method of claim 15, further comprising downloading headset information to the communication device from the Web server.

18. The method of claim 17, wherein the headset information is selected from the group consisting of a Receive Signal Strength Indication (RSSI) from an Access Point (AP), AP availability, AP location, transmit and receive audio buffer fullness, call session information, performance diagnostic, and software or firmware update.

* * * * *